United States Patent [19]

Kudchadker et al.

[11] 4,319,636

[45] Mar. 16, 1982

[54] SURFACTANT WATERFLOOD OIL RECOVERY PROCESS

[75] Inventors: Mohan V. Kudchadker, Houston; Lawrence E. Whittington, Katy, both of Tex.

[73] Assignee: Texaco Inc., White Plains, N.Y.

[21] Appl. No.: 122,219

[22] Filed: Feb. 19, 1980

[51] Int. Cl.³ ............................................. E21B 43/22
[52] U.S. Cl. .................... 166/274; 166/275; 252/8.55 D
[58] Field of Search ................. 252/8.55 D; 166/274, 166/275

[56] References Cited

U.S. PATENT DOCUMENTS

| | | | |
|---|---|---|---|
| 3,888,308 | 6/1975 | Gale et al. | 166/274 X |
| 4,042,030 | 8/1977 | Savins et al. | 252/8.55 X |
| 4,110,228 | 8/1978 | Tyler et al. | 252/8.55 |
| 4,110,229 | 8/1978 | Carlin et al. | 252/8.55 |
| 4,125,158 | 11/1978 | Waite et al. | 166/273 |
| 4,181,178 | 1/1980 | Savins | 252/8.55 |
| 4,199,027 | 4/1980 | Cox et al. | 252/8.55 |

*Primary Examiner*—Herbert B. Guynn
*Attorney, Agent, or Firm*—Carl G. Ries; Robert A. Kulason; Jack H. Park

[57] ABSTRACT

Disclosed is a surfactant waterflooding oil recovery process for use in high salinity water-containing formations employing two separate surfactant-containing slugs or a single slug in which the composition is changed from the first to the last portion of the slug injected into the formation. The first portion of the surfactant fluid contains a surfactant combination which exhibits optimum low surface tension characteristics, and the second or latter portion of the surfactant slug contains a blend of surfactants which produces a high viscosity fluid. Use of hydrophilic viscosity-increasing polymer is thus avoided, eliminating the interaction between polymer and surfactant which causes a reduction in surfactant effectiveness.

13 Claims, 6 Drawing Figures

SURFACTANT WATERFLOOD OIL RECOVERY PROCESS

FIELD OF THE INVENTION

This invention concerns a process for enhanced oil recovery, and more particularly it pertains to an improved surfactant waterflooding enhanced oil recovery process.

BACKGROUND OF THE INVENTION

It is well recognized by persons skilled in the art of oil recovery techniques that only a fraction of the amount of petroleum or oil initially present in the petroleum reservoir is recovered by primary recovery methods, e.g. by pumping or allowing the oil to flow to the surface of the earth as a consequence of naturally-occuring energy forces, or even when secondary recovery processes such as waterflooding are employed. Although waterflooding is an inexpensive and commercially successful enhanced oil recovery process, water does not displace oil efficiently even in those portions of the formation through which it passes, because water and oil are immiscible and the interfacial tension between water and oil is quite high. This reason for the failure of waterflooding to recover all or even a substantial portion of the oil remaining in the formation after completion of primary recovery operations has also been recognized by persons skilled in the art of enhanced oil recovery, and many literature references suggest the incorporation of a variety of surface active agents (e.g., surfactants) in the flood water, for the purpose of reducing the interfacial tension between the injected aqueous fluid and the formation petroleum, which accomplishes an increase in the amount of oil displaced by the injected fluid. Petroleum sulfonates have been suggested in many references and have been employed in field trials of surfactant waterflooding oil recovery process, with varying degrees of success, although petroleum sulfonates can only be used without additional solubilizing surfactants in formations containing relatively low salinity water, e.g. formations containing water whose salinity is less than about 20,000 parts per million total dissolved solids.

It is also well recognized that other types of surfactants may be used alone or in combination with petroleum sulfonates in high salinity water-containing formations. Alkylpolyethoxy sulfates or alkylarylpolyethoxy sulfates may be used alone or as a solubilizing co-surfactant for petroleum sulfonate in high salinity water-containing formations so long as the formation temperature is less than about 140° F. (60° C.). Ethoxy sulfates are not recommended for use in higher temperature formations because of their tendency to hydrolyze, and the rate of hydrolysis increases with increased temperature. It is also known in the art to employ, either alone or in combination with petroleum sulfonates, alkylpolyethoxyalkylene sulfonates or alkylarylpolyethoxyalkylene sulfonates, which are very tolerant of high salinity of water and stable at elevated temperatures.

Despite the encouraging results which have been reported in the literature employing the above-described combination processes in high salinity water-containing oil formations, the actual experience to date in field trials employing these processes have been disappointing for a variety of reasons. Adsorption of the salinity-tolerant surfactants is a serious problem, which increases the cost of the fluid and decreases the effectiveness of the oil recovery process. The amount of oil recovered in many instances has been substantially less than originally expected, based on laboratory experiments, and this is at least in part related to the above-described phenomena of surfactant loss from the fluid to the formation. Another serious problem which has been encountered at times, is an adverse interaction between the ethoxy sulfates or ethoxy sulfonates and certain hydrophilic polymeric materials such as polyacrylamide or polysaccharides commonly injected subsequent to the injection of the surfactant fluid, for the purpose of insuring a favorable mobility ratio between the injected fluid and the displaced fluids. Moreover, optimum hydrophilic polymer performance is achieved in relatively low salinity environments, but contact between low salinity polymer fluids and high salinity surfactant fluids degrades the effectiveness of a surfactant combination which is tailored to produce optimum results in high salinity environments, and so the interaction between the high salinity surfactant fluid and the low salinity polymer fluid causes some degradation of both polymer effectiveness and surfactant effectiveness.

In view of the foregoing discussion, and the current serious petroleum shortage which could be significantly alleviated with an effective and economical enhanced oil recovery process, it can be appreciated that there is a significant commercial need for an economical surfactant waterflooding enhanced oil recovery process suitable for use in high salinity environments, which avoid at least certain of the aforementioned disadvantages encountered using surfactant waterflooding processes as are now practiced.

PRIOR ART

U.S. Pat. Nos. 4,066,124 and 4,110,228 describe oil recovery processes and methods for selecting the optimum ethoxylated and sulfonated or ethoxylated and sulfated surfactant for use in combination with petroleum sulfonate, and also for selecting the optimum ratio of solubilizing co-surfactant to primary anionic organic sulfonate surfactant, for any particular salinity environment in which the surfactants are to be employed.

U.S. Pat. No. 4,018,278 teaches an oil recovery process employing an ethoxylated and sulfonated surfactant in single surfactant form. U.S. Pat. No. 3,827,497 describes an oil recovery process using an ethoxylated and sulfonated surfactant in combination with an organic sulfonate including petroleum sulfonate. U.S. Pat. No. 3,508,612 describes an oil recovery process employing an ethoxylated and sulfated surfactant in combination with petroleum sulfonate.

U.S. Pat. No. 4,165,785 describes an oil recovery process employing an ethoxylated and sulfonated surfactant in single surfactant mode, with the first slug containing a surfactant which is tailored to produce at least a minimum amount of emulsion and the second surfactant being selected to insure that no emulsion is produced, but that the interfacial tension is reduced below a certain level.

U.S. Pat. No. 4,181,178 describes a surfactant waterflooding oil recovery method comprising injecting a low viscosity surfactant fluid followed by a viscous, saline solution of a sulfonated, polyethoxylated aliphatic alcohol having an HLB in the range of 10–14.

SUMMARY OF THE INVENTION

We have discovered an improved surfactant waterflooding enhanced oil recovery process which is especially useful for recovering oil from subterranean formations containing high salinity water. The process employs an aqueous fluid containing at least one primary anionic surfactant, preferably petroleum sulfonate having a median equivalent weight of the range from about 350 to about 450, or a $C_8$ to $C_{25}$ and preferably $C_{12}$ to $C_{18}$ alkyl sulfonate or an alkylaryl sulfonate including benzene, toluene, or xylene having attached thereto at least one $C_8$ to $C_{22}$ and preferably $C_{12}$ to $C_{18}$ alkyl, and at least an amount of a solubilizing co-surfactant sufficient to render the primary anionic surfactant slightly soluble in the saline fluid in which it is formulated. The preferred solubilizing co-surfactants include nonionic surfactants such as ethoxylated $C_8$ to $C_{22}$ alcohols or alkyl phenols wherein the alkyl group contains from $C_6$ to $C_{18}$ carbon atoms.

Another preferred solubilizing co-surfactant in an ethoxylated and sulfonated surfactant having the following formula:

$$RO(R'O)_n R'' SO_3^- X^+$$

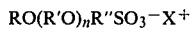

wherein R is a $C_8$ to $C_{22}$ and preferably $C_{12}$ to $C_{18}$ alkyl or an alkylaryl such as benzene toluene or xylene having attached thereto at least one $C_6$ to $C_{18}$ and preferably $C_8$ to $C_{15}$ alkyl group, R' is ethylene or a mixture of ethylene and propylene or other higher alkylene with relatively more ethylene than higher alkylene, n is a number representing the average number of alkylene oxide units, R'' is ethylene, propylene, hydroxypropylene or butylene, S is sulfur, O is oxygen, and X is a monovalent cation, preferably sodium, potassium, lithium or ammonium.

Another preferred surfactant is an ethoxylated and sulfated surfactant having the formula:

$$RO(R'O)_n SO_3^- M^+$$

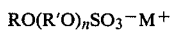

wherein R, O, R', n, S and M have the same meaning as above.

The leading edge, or first portion of the surfactant fluid injected into the formation, ordinarily has a salinity from 50 to 150 and preferably 90 to 110 percent of the salinity of the water present in the flow channels of the formation into which it is injected. The precise organic sulfonate employed, e.g., the equivalent weight of petroleum sulfonate or the number of carbon atoms in the alkyl or alkylaryl sulfonate, the degree of ethoxylation of the solubilizing co-surfactant, and the ratio of solubilizing co-surfactant to primary anionic surfactant for this portion of the surfactant fluid is carefully chosen so as to render the surfactants at least slightly soluble in this salinity fluid, and to reduce the interfacial tension between the aqueous fluid and formation petroleum to a value less than $2 \times 10^{-2}$ dynes per centimeter in order to insure effective low surface tension displacement of petroleum. Methods for selecting the preferred components and ratio of primary surfactant to solubilizing co-surfactant are well known in the art. The second slug of fluid injected into the formation, or the composition of the latter portion of the surfactant slug injected into the formation, may contain precisely the same or similar components, in any event at least one primary anionic surfactant such as petroleum sulfonate and at least one solubilizing co-surfactant such as those disclosed above will be employed, but the equivalent weight of the organic sulfonate, the degree of ethoxylation of a solubilizing co-surfactant, and the ratio of the primary anionic surfactant to solubilizing co-surfactant, are all selected so as to produce a maximum fluid viscosity in the surfactant fluid. This insures efficient mobility ratio and hence effective displacement of the first portion of the formation and oil displaced thereby, by the second slug of surfactant fluid and subsequently injected fluids. It is preferred that no polymer is employed after this fluid, in order to prevent a polymer-surfactant interaction. All of the injected fluids are displaced through the formation by injecting brine or fresh water or a combination thereof, with petroleum production being taken from a spaced-apart production well.

DESCRIPTION OF THE PREFERRED EMBODIMENTS

Figure 1:
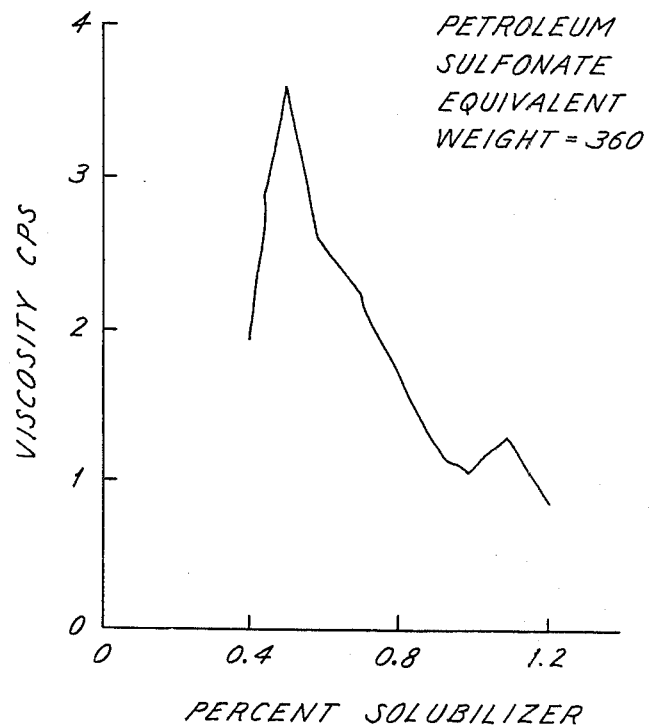
FIG. 1 illustrates how the viscosity of a surfactant fluid containing petroleum sulfonate whose average equivalent weight is 360, varies with the percent of solubilizing co-surfactant, which was a nonylbenzene hexaethoxyethylene sulfonate, sodium salt.

Briefly, the process of our invention is an improvement in a surfactant waterflooding enhanced oil recovery process, particularly a process used in an oil formation containing high salinity water. The process will employ at least two aqueous slugs, each of which contain two surfactants:

1. A primary anionic surfactant, preferably an organic sulfonate. Petroleum sulfonate is a particularly preferred organic sulfonate, because of its low-cost, effectiveness, and wide spread availability. The particularly preferred petroleum sulfonate is one which is comprised of a broad spectrum of molecular species differing in equivalent weight over a range from 200 to 700 and having a median equivalent weight in the range from about 325 to about 475 and preferably from about 350 to about 450. $C_{10}$ to $C_{25}$ alkyl or alkylaryl sulfonates are also suitable organic sulfonates for this application. Combinations of the foregoing may also be used.

2. A solubilizing co-surfactant should be used in at least a portion of the surfactant fluid, in order to render the above-described primary anionic surfactant at least slightly soluble in that fluid. The amount of solubilizing co-surfactant necessary to accomplish solubilization of the organic sulfonate primary anionic surfactant is largely determined by the salinity of the fluid in which the surfactants are dissolved.

The preferred solubilizing co-surfactants which may be employed in our process include nonionic surfactant, e.g. an ethoxylated alcohol, surfactants which are ethoxylated and sulfated or ethoxylated and sulfonated, as are shown by the following formulas:

(A) Ethoxylated alcohols, e.g. ethoxylated alkanols or alkyl phenols of the formula:

$$RO(R'O)_nH$$

wherein R is a $C_8$ to $C_{22}$ and preferably $C_{12}$ to $C_{18}$ alkyl, linear or branched, or alkylaryl group such as benzene, toluene or xylene having attached thereto at least one $C_6$ to $C_{18}$ and preferably $C_8$ to $C_{15}$ alkyl group, linear or branched, R' is ethylene or a mixture of ethylene and propylene or other higher alkylene group with relatively more ethylene than higher alkylene, n is a number from 2 to 12 and preferably from 3 to 8 representing the average number of alkylene oxide units. These surfactants should only be employed when the formation temperatures are not significantly greater than the cloud points of the nonionic surfactants.

(B) $RO(R'O)_nR''SO_3^-X^+$ (ethoxy sulfonate) wherein R is a $C_8$ to $C_{22}$ and preferably $C_{12}$ to $C_{18}$ alkyl, linear or branched, or alkylaryl group such as benzene, toluene or xylene having attached thereto at least one $C_6$ to $C_{18}$ and preferably $C_8$ to $C_{15}$ alkyl group, linear or branched, R' is ethylene or a mixture of ethylene and propylene or other higher alkylene group with relatively more ethylene than higher alkylene, n is a number from 2 to 12 and preferably from 3 to 8 representing the average number of alkylene oxide units, R'' is ethylene, propylene, hydroxypropylene or butylene, S is sulfur, O is oxygen, and X is a monovalent cation, preferably sodium, potassium, lithium, or ammonium.

(C) $RO(R'O)_nSO_3^-X^+$ (ethoxy sulfate) wherein R, O, R', n, S and X have the same definiations as above.

In formula (C), the surfactant is an alkylpolyalkoxy sulfate or alkylarylpolyalkoxy sulfate surfactant. This is a preferred surfactant for use in high salinity environments, e.g. in formations containing water having salinities in the range from 20,000 parts per million total dissolved solids up to as high as 240,000 parts per million total dissolved solids, so long as the formation temperature is less than about 140° F. (60° C.), since the ethoxylated and sulfated surfactants are prone to hydrolyze at a rate which increases with increased temperature. The surfactants are the preferred surfactants in low temperature formations mainly because they are less expensive and more readily available than the ethoxy sulfonate surfactants.

If the formation temperature exceeds about 140° F., the preferred solubilizing co-surfactant for use in our process is the ethoxy sulfonates, e.g. alkylpolyalkoxyalkylene sulfonate or alkylarylpolyalkoxyalkylene sulfonate of formula (C). In this instance, R'' in formula (C) is ethylene, propylene, hydroxypropylene or butylene. These surfactants are quite suitable for use in high salinity water-containing formations and resistant to hydrolysis or other degradation at elevated temperatures, and may be used in formations whose temperature is as high as 350° F. (175° C.).

Many prior art references teach oil recovery processes using an aqueous saline fluid containing the above-described combinations of surfactants, and further teach how the optimum solubilizing co-surfactant is selected for a particular application, and further how the optimum ratio of solubilizing co-surfactant to primary anionic surfactant is selected to achieve minimum interfacial tension. Briefly, the methods comprise identifying the solubilizing co-surfactants and concentration thereof which form phase stable, low surface tension aqueous fluids with petroleum sulfonates at the salinity of the formation into which the fluids are to be injected. The minimum amount of solubilizer which just accomplishes solubilization of petroleum sulfonate may be identified by direct observation of the system, e.g. observing the amount of solubilizing co-surfactant which accomplishes irradication of the undissolved petroleum sulfonate phase in a saline solution using the surfactants being investigated, or by identifying the ratio of solubilizing co-surfactant to primary anionic surfactant which produces a fluid having a minimum value of electrical conductivity. Another method comprises identifying the ratio of solubilizing co-surfactant to primary anionics surfactant which produces a fluid having a particular characteristic appearance associated with the fluid having surfactants at a condition of borderline solubility. The end point appearance is a pearlescence or silver swirl appearance, which is easily detected by visual observation of the fluids.

The essence of our invention is concerned with the particular way in which the second portion of the surfactant-containing fluid is formulated and injected into the formation. The method described in most prior art references comprises formulating essentially a single, uniform slug of surfactant, which is injected into the formation, with the salinity and concentration of all of the surfactant components of the slug being held uniform from the leading edge to the trailing edge thereof. We have discovered a significant improvement is attained if the composition of the fluids used and the concentration of the solubilizing co-surfactant are changed from the leading edge to the trailing edge of the surfactant fluid. This may be accomplished in two basic ways. In one method, the composition is changed in a continuous, gradual fashion from the value of the leading edge to the value at the trailing edge. In the other method, two discrete slugs are formulated and injected with the composition being maintained relatively uniformly throughout the injection of each slug. In either case, the first slug or first portion of the slug will have the composition tailored to produce minimum interfacial tension and therefore maximum low surface tension displacement of petroleum. The second slug or second portion of the slug will be tailored to exhibit maximum fluid viscosity, since we have discovered that very slight changes in the composition of the surfactant fluid can produce surprisingly large increases in the fluid viscosity. The viscosity of the second slug can be made sufficiently great to achieve efficient displacement of the previously injected fluids without the use of hydrophilic polymers. By avoiding the necessity of injecting one or more slugs containing hydrophilic polymers such as polyacrylamide or polysaccharides, the danger of polymer-surfactant interaction is eliminated. Moreover, the cost of the polymer portion of the chemical flood is thereby eliminated, which improves the economics of the enhanced oil recovery process considerably.

The method for identifying the optimum components and ratio of components of the first slug of surfactant fluid is well documented in the prior art. Methods such as those discussed previously for identifying the optimum organic sulfonate, optimum species of solubilizing co-surfactant and the optimum ratio of these materials such as is described in the prior art, are used in formulating the first fluid employed in the process of our invention. The essence of our invention is concerned with the method of formulating the second surfactant fluid, and the use of that fluid in an oil recovery process to achieve favorable mobility ratio and hence efficient displacement of previously injected fluids as well as mobilized petroleum, without the use of hydrophilic polymers which cause serious problems due to the interaction between high salinity soluble surfactants and the polymers in situ in the formation.

The difference between the composition of the first and second fluids are somewhat subtle, but these differences produce significant variations in the fluid properties and their performance in the porous petroleum containing formation. The equivalent weight of petroleum sulfonate employed in the fluids is one important controllable parameter, and in almost all instances the equivalent weight of petroleum sulfonate employed in the first fluid will be somewhat different, usually lower than the equivalent weight of petroleum sulfonate employed in the second fluid. In fact most petroleum sulfonates are blends of a great many molecular species having a range of equivalent weights, and the desired equivalent weight for either fluid is achieved by blending together two or more samples of petroleum sulfonates of significantly different average equivalent weights, so the principal difference in petroleum sulfonate employed in the first fluid versus the second fluid may be merely in the ratio of the two dissimilar petroleum sulfonates blended to produce the desired average equivalent weight material for each of the fluids. This means the number of types of petroleum sulfonate which must be blended together will be the same as is ordinarily employed in a conventional state-of-the-art enhanced oil recovery process, but will be blended in different ratios for use in the two fluids.

The solubilizing co-surfactant employed in the first fluid may also be slightly different to the solubilizing co-surfactant employed in the second fluid. In some instances, however, it is possible to use the same solubilizing co-surfactant in each fluid, although in such case the ratio of solubilizing co-surfactant to organic sulfonate primary anionic surfactant will be different in the first fluid and second fluid, as will be seen more clearly in the examples and discussion below.

Although it is sometimes possible to achieve a viscous fluid using petroleum sulfonate having the same average equivalent weight as is selected for optimum low surface tension displacement of petroleum, the amount of solubilizing co-surfactant required to produce a maximum fluid viscosity usually varies with the equivalent weight of petroleum sulfonate with which it is employed. Since the cost of the solubilizing co-surfactant is usually from 3 to 5 times the cost of the organic sulfonate primary anionic surfactant, it is highly desirable to identify the petroleum sulfonate which requires the minimum amount of solubilizing co-surfactant to produce the desired viscous fluid for use in the second slug with employing the process of our invention. Also, the maximum viscosity which can be developed is often greater when using a petroleum sulfonate of different equivalent weight from that which produces the optimum low surface tension oil displacement effectiveness.

The concentration of each of the surfactants should be determined experimentally in order to achieve the two desired results according to the foregoing discussion, but subject to this and as a general guideline, the concentration of the primary anionic surfactant, e.g. the petroleum sulfonate or other organic sulfonate is generally in the range of from 0.5 to 15 and preferably from 1 to 6 percent by weight. The concentration of the solubilizing co-surfactant is ordinarily from 0.5 to 6 and preferably from 1 to 3 percent by weight.

The total pore volume of surfactant injected into the formation is about the same as is ordinarily employed in state-of-the-art surfactant flooding oil recovery processes. That is to say, from 0.05 to 1.0 and preferably 0.1 to 0.5 pore volumes of surfactant fluid should be injected into the formation, the pore volumes being based on the estimated pore volume of formation to be invaded by the injected fluid in a particular application. The percentage of this total volume of fluid which is the first slug, i.e. the slug of surfactant fluid tailored to achieve minimum interfacial tension, should be from 25 to 80 and preferably 40 to 70 percent of the total volume of surfactant fluid injected, with the remainder of the total pore volume being made up of the second slug, which is the surfactant slug tailored to achieve a maximum fluid viscosity.

The method applying the process of our invention will be more fully understood by reference to the following experimental examples.

EXPERIMENTAL SECTION

Figure 2:
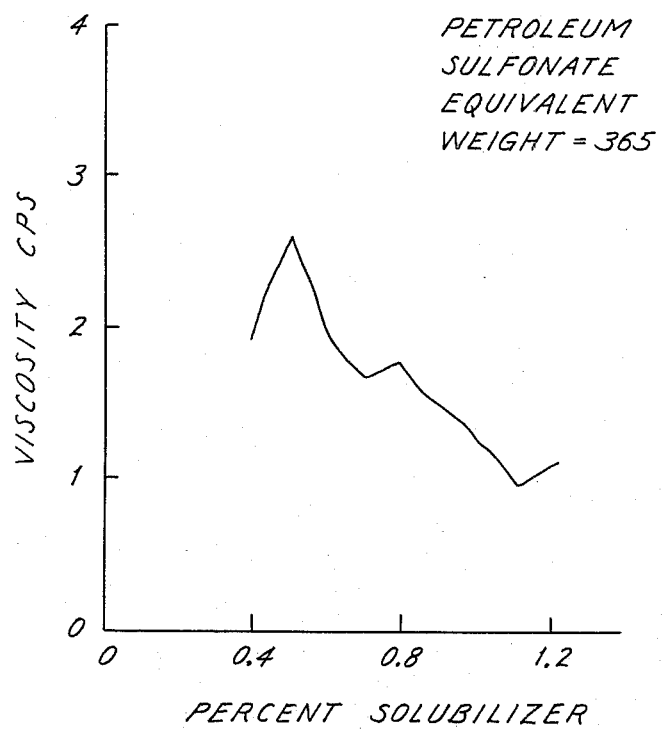
FIG. 2 illustrates how the viscosity of a surfactant fluid containing petroleum sulfonate whose average equivalent weight is 365, varies with the percent of solubilizing co-surfactant, which was a nonylbenzene hexaethoxyethylene sulfonate, sodium salt.

A series of experiments were performed for verifying the ability to produce a viscous fluid by proper selection and balance of the surfactant components, without using any hydrophilic polymer such as polyacrylamide or polysaccharide. The first step was to prepare a series of blends of petroleum sulfonate by mixing together two commercially available petroleum sulfonate products in various proportions. The two petroleum sulfonates employed for blending the various mixtures of petroleum sulfonate to be discussed below, were TRS18 and TRS40, both of which are commercially available petroleum sulfonates sold by Witco Chemical Company. The average equivalent weight of TRS40 is 332, whereas the average equivalent weight of TRS18 is 497. By mixing these materials together, it is possible to prepare a petroleum sulfonate having any desired equivalent weight between these two values. Four blends of these materials were prepared, having average equivalent weights of 360, 365, 370 and 375. A series of solutions were prepared in which the concentration of petroleum sulfonate was held constant at 5%(wt) and the salinity was made constant at 90,000 parts per million total dissolved solids including 9,000 parts per million divalent ions. The solubilizing co-surfactant employed in this series of tests was a sodium salt of nonylbenzenehexaethoxyethylene sulfonate. A number of solutions were prepared with each petroleum sulfonate blend, and the viscosity of the fluid was determined after an aging period of 24 hours employing a Cannon-Fenske bulb viscometer. The results are shown graphically in FIGS. 1-4. The series of experiments employing the petroleum sulfonate blend having an average equivalent weight of 360 is shown in FIG. 1. A similar series of tests were performed for the blend having an average equivalent weight of 365, and the viscosity versus percent solubilizer for this series of tests is shown in FIG. 2. Similar experiments were performed using the other two blends of petroleum sulfonate, and these results are shown graphically in FIGS. 3 and 4. It can be seen that for each of these blends, a surprisingly sharp peak in the viscosity function is observed when the amount of solubilizing co-surfactant is at a critical value. In each series of tests, the concentration of petroleum sulfonate and the fluid salinity are held constant, the only difference in the nine viscosity values on which FIG. 1 is based being the difference in solubilizing co-surfactant concentration, which varied from 0.4 to 1.2.

It can be seen that the maximum value occurred at a concentration value of 0.5 percent solubilizer, and the viscosity obtained was nearly twice as great as the viscosity of an otherwise similar fluid having only 0.4 percent by weight solubilizer. Similarly, when the solubilizing co-surfactant concentration was increased to 0.6 percent, the maximum viscosity fell from about 3.6 to about 2.5, indicating the extreme sensitivity of viscosity to solubilizer concentration.

FIG. 2 illustrates a somewhat similar behavior, although the change in viscosity was not as great and the maximum viscosity developed was not as great. The only difference between the series of experiments whose data is shown graphically in FIG. 2 as compared to the series of experiments illustrated in FIG. 1, was the fact that the petroleum sulfonate used in the series of experiments on which FIG. 2 is based had an average equivalent weight of 365 compared to 360 for the series of tests on which FIG. 1 is based. It is very surprising that the slight change in equivalent weight of petroleum sulfonate of only 5 units, produce such substantial change in viscosity response.

Figure 3:
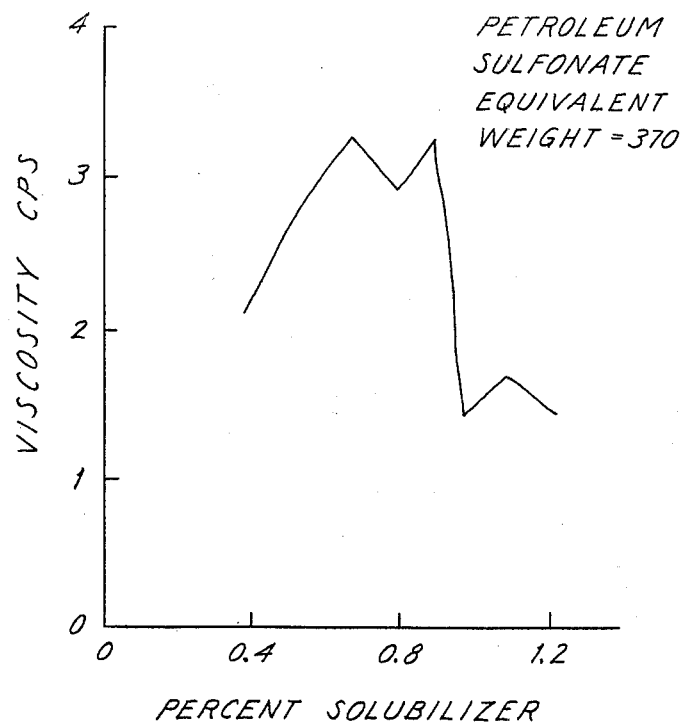
FIG. 3 illustrates how the viscosity of a surfactant fluid containing petroleum sulfonate whose average equivalent weight is 370, varies with the percent of solubilizing co-surfactant, which was a nonylbenzene hexaethoxyethylene sulfonate, sodium salt.

FIG. 3 illustrates still another series of experiments identical to those discussed above except that average equivalent weight of the petroleum sulfonate employed in this series was 370.

Figure 4:
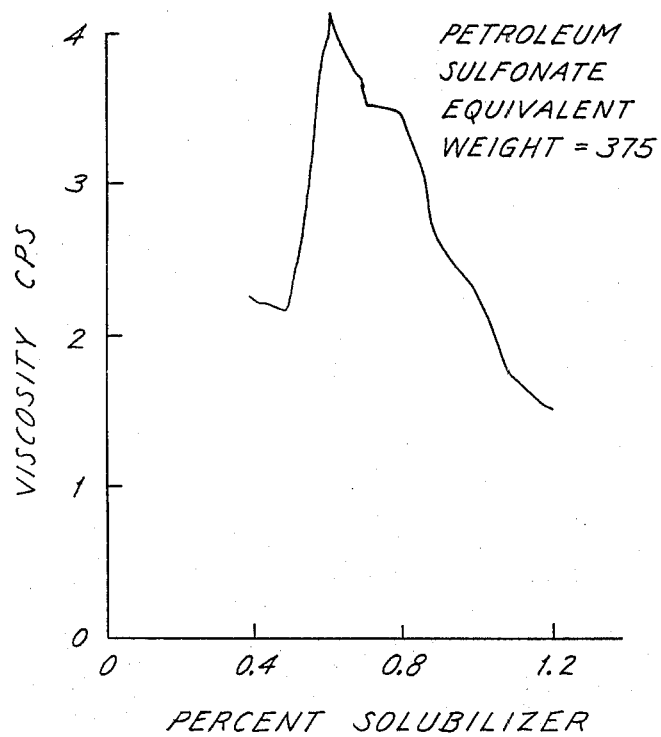
FIG. 4 illustrates how the viscosity of a surfactant fluid containing petroleum sulfonate whose average equivalent weight is 375, varies with the percent of solubilizing co-surfactant, which was a nonylbenzene hexaethoxyethylene sulfonate, sodium salt.

FIG. 4 illustrates graphically the results obtained using the petroleum sulfonate blend having an average equivalent weight of about 375. It can be seen that the greatest viscosity was obtained using the petroleum sulfonate blend having an average equivalent weight of 375, although this required slightly more solubilizer than was required to obtain the maximum viscosity for the first series of experiments whose results are shown in FIG. 1. The fluid corresponding to the series of experiments shown in FIG. 1 would be slightly less expensive because a smaller amount of solubilizer is required, with essentially all of the factors being about the same.

In all of the above experiments, the concentration of petroleum sulfonate was maintained at a constant concentration of 5 percent by weight, and the fluid salinity was maintained at 90,000 parts per million, with the solubilizing co-surfactant concentration being varied from 0.4 to 1.2 percent by weight.

Figure 5:
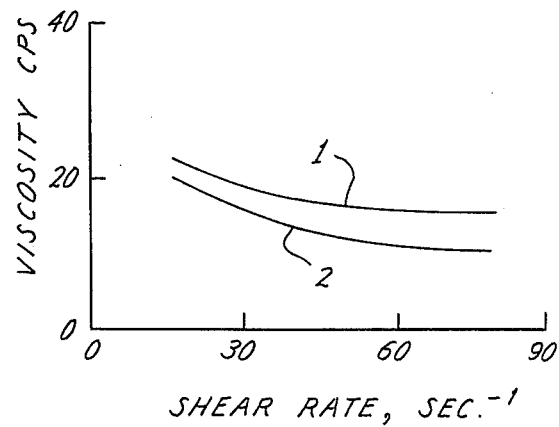
FIG. 5 illustrates the change in fluid viscosity with shear rate for a polymer solution and for a viscous surfactant solution.

Additionally viscosity data was obtained by measuring the viscosity with a Brookfield viscometer at various shear rates. This was compared with an aqueous solution containing 1,000 parts per million Kelzan MF ®, a commercially available polysaccharide which is used routinely as a hydrophilic polymer for producing a viscous solution needed to obtain a favorable mobility ratio in displacement type enhanced oil recovery processes. The results are shown graphically in FIG. 5, and it can be seen that at low shear rates, e.g. around 15 reciprocal seconds the viscosity of the surfactant fluid 1 is slightly greater than the viscosity of the polymer fluid 2. As the shear rate increases, the surfactant system viscosity decreases less rapidly than does the Kelzan polymer fluid viscosity, further establishing the superior viscosity properties of the viscous surfactant fluid employed in our process.

Figure 6:
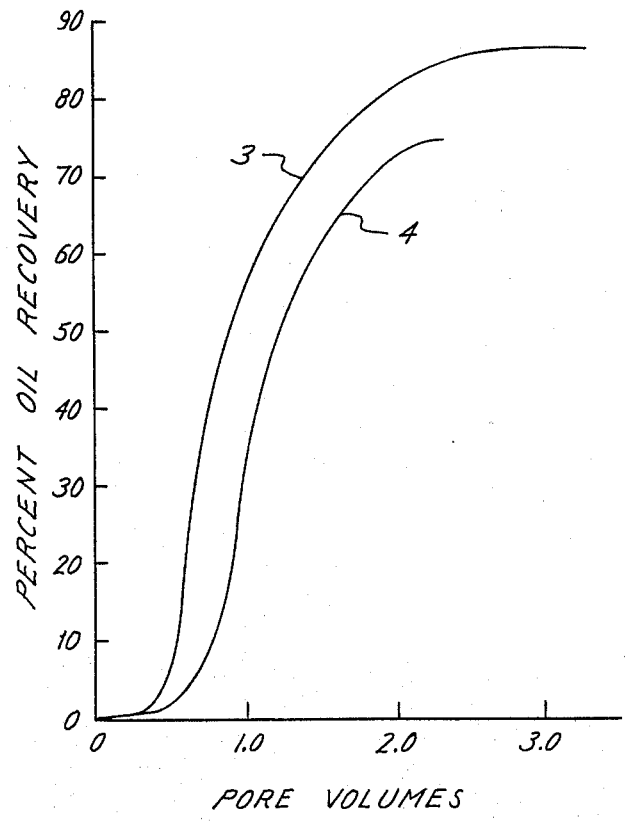
FIG. 6 illustrates the amount of oil recovered in a core flooding experiment employing the multiple slug process of this invention in which no polymer was injected, as compared to a conventional surfactant flood in which a viscous polymer-containing fluid was injected subsequent to injecting the surfactant fluid.

For the purpose of verifying the improvement in oil recovery effectiveness resulting from using our process without polymer as compared to a more conventional process in which a surfactant fluid is followed by a polymer solution, two core displacement tests were performed. Both tests involved injecting an aqueous surfactant fluid prepared according to the process of our invention except that only a single, viscous surfactant slug was used. This fluid was comprised of 0.73 percent TRS18, 2.46 percent TRS40, resulting in a 3.19 percent by weight total petroleum sulfonate concentration, the petroleum sulfonate average equivalent weight being about 370. The fluid also contained 1.83 percent by weight of nonylbenzenepentaethoxyethylene sulfonate, sodium salt. A second otherwise identical system was prepared in which the surfactant system was followed by an aqueous fluid containing 1,000 parts per million Kelzan, illustrating the process according to prior art teachings. It can be seen that the surfactant flood conducted without Kelzan Curve 3 in FIG. 6, recovered significantly more oil and all values of pore volume of surfactant fluid injected than was obtained using the same amount of surfactant fluid in combination with Kelzan polymer, shown by Curve 4. Although the exact reason for the difference in performance is not known for certain, it is believed that the interaction between polymer and surfactant caused retention of surfactant in the core, thereby reducing the amount of surfactant available for low surface tension displacement of oil, which caused a reduction in the amount of oil recovered from the core during the experiment.

Another series of experiments were performed to verify that desirable viscous, polymer-free fluids can be prepared using a $C_9$ alkylbenzenepolyethoxy sulfate. The solution was prepared by dissolving 1.8 percent petroleum sulfonate (equivalent weight 399) and 0.7 percent nonylbenzenetetraethoxy sulfate in 90,000 ppm brine. Viscosity values at several values of shear rate were determined for this fluid and for a standard polymer solution, containing 1,000 parts per million Xanflood ® biopolymer in fresh water. The data are listed in Table I below.

TABLE I

| Shear Rate sec$^{-1}$ | Ethoxy Sulfate Viscosity cps | Bipolymer Viscosity cps |
|---|---|---|
| 3.67 | 100.0 | 39.6 |
| 7.34 | 52.0 | 29.8 |
| 14.7 | 31.25 | 22.5 |
| 36.7 | 19.56 | 14.06 |

Thus we have disclosed and demonstrated how the interaction between surfactant and polymer can be avoided by eliminating polymer from the fluids injected into a formation, by employing a surfactant flood in which an optimum low surface tension combination of organic sulfonate and solubilizing co-surfactant is injected first followed by a slug of surfactant containing organic sulfonate, wherein the materials and ratios thereof for the second slug are selected on the basis of producing a maximum viscosity fluid, followed by injecting polymer-free fluid to displace the surfactants through the formation. While the foregoing discussion included a proposed explanation for the improved results obtained, it is not necessarily represented hereby that this is the only or even the principal mechanism responsible for the improved results observed. Similarly, while our invention has been described in terms of a number of illustrative embodiments, it is clearly not so limited since many variations thereof will be apparent to persons skilled in the related art of enhanced oil recovery by surfactant waterflooding without departing from the true spirit and scope of our invention. It is our intention and desire that our invention be limited and restricted only by those limitations and restrictions appearing in the claims appending immediately hereinafter below.

We claim:

1. In a method for recovering petroleum from a subterranean, permeable, saline water and petroleum-containing formation, said formation being penetrated by at least one injection well and by at least one spaced-apart production well, comprising injecting into the formation via the injection well a predetermined quantity of aqueous fluid containing at least two surfactants, one petroleum sulfonate primary anionic surfactant and one solubilizing co-surfactant selected from the group consisting of nonionic surfactants having the following formula:

$$R_a O(R_a'O)_{na} H$$

wherein $R_a$ is a $C_8$ to $C_{22}$ alkyl or an alkylaryl comprising benzene, toluene or xylene having attached thereto at least one $C_6$ to $C_{18}$ alkyl group, $R_a'$ is ethylene or a mixture of ethylene and higher molecular weight alkylene with relatively more ethylene than higher molecular weight alkylene, na is a number from 2 to 12, O is oxygen and H is hydrogen; ethoxylated and sulfonated surfactants having the following formula:

$$R_b O(R_b'O)_{nb} R_b'' SO_3 M_b$$

wherein $R_b$ is a $C_8$ to $C_{22}$ alkyl or an alkylaryl consisting of benzene, toluene or xylene having attached thereto at least one alkyl group containing from 6 to 18 carbon atoms, $R_b'$ is ethylene or a mixture of ethylene and higher alkylene with relatively more ethylene than higher alkylene, nb is a number from 2 to 12, $R_b''$ is ethylene, propylene, hydroxypropylene or butylene, O is oxygen, S is sulfur and $M_b$ is a monovalent cation selected from the group consisting of sodium, potassium, lithium and ammonium; ethoxylated and sulfated surfactants having the following formula:

$$R_c O(R_c'O)_{nc} SO_3 M_c^+$$

wherein $R_c$ is a $C_8$ to $C_{22}$ alkyl or an alkylaryl consisting of benzene, toluene or xylene having attached thereto at least one alkyl group containing from 6 to 18 carbon atoms, $R_c'$ is ethylene or a mixture of ethylene and higher alkylene with relatively more ethylene than higher alkylene, nc is a number from 2 to 12, O is oxygen, S is sulfur and $M_c$ is a monovalent cation selected from the group consisting of sodium, potassium, lithium and ammonium; and mixtures thereof, said surfactant fluid displacing petroleum through the formation from which it is recovered to the surface of the earth via the production well, the improvement which comprises:

selecting and blending the petroleum sulfonate and solubilizing co-surfactant in the first portion of the surfactant-containing fluid so as to yield a fluid which reduces the interfacial tension between water and the formation petroleum to a value less than $2 \times 10^{-2}$ dynes per centimeter, the ratio of solubilizing cosurfactant to petroleum sulfonate being such that the cosurfactant-petroleum sulfonate combination exhibits borderline solubility in the aqueous phase, and selecting and blending the petroleum sulfonate and solubilizing co-surfactant of the second portion of the aqueous surfactant fluid so as to produce a fluid exhibiting substantially greater viscosity than the viscosity of the first portion of the slug, the average equivalent weight of petroleum sulfonate used in the second portion of fluid being selected to produce maximum fluid viscosity and being different from the average equivalent weight of petroleum sulfonate used in the first portion, and the ratio of solubilizing co-surfactant to petroleum sulfonate in the second portion of surfactant fluid being selected to produce maximum fluid viscosity and being different from the ratio used in the first portion of surfactant fluid.

2. A method as recited in claim 1 wherein $R_a$ is benzene, toluene or xylene having attached thereto a $C_8$ to $C_{15}$ alkyl group.

3. A method as recited in claim 1 wherein na is from 3 to 8.

4. A method as recited in claim 1 wherein na is from 3 to 8.

5. A method as recited in claim 1 wherein $R_b'$ is an alkyl group containing from 12 to 18 carbon atoms.

6. A method as recited in claim 1 wherein $R_b$ is an alkylaryl containing from 8 to 15 carbon atoms in the alkyl portion thereof.

7. A method as recited in claim 1 wherein $R_b'$ is ethylene.

8. A method as recited in claim 1 wherein $R_b''$ is ethylene.

9. A method as recited in claim 1 wherein $R_c$ is a $C_{12}$ to $C_{18}$ alkyl.

10. A method as recited in claim 1 wherein $R_c$ is an alkylaryl containing from 8 to 15 carbon atoms in the alkyl portion thereof.

11. A method as recited in claim 1 wherein $R_c'$ is ethylene.

12. A method as recited in claim 1 wherein the petroleum sulfonate used in the second portion of fluid is petroleum sulfonate whose median equivalent weight is in the range of from 325 to 475 and the precise value thereof is determined by directly measuring the viscosity of a series of fluids prepared employing petroleum sulfonates within this range and identifying the median equivalent weight of petroleum sulfonate which produces maximum viscosity.

13. A method as recited in claim 1 wherein the ratio of solubilizing co-surfactant to petroleum sulfonate used in the second portion of the surfactant fluid is identified by preparing a series of solutions containing the same concentration of petroleum sulfonate samples of different equivalent weight in the range from 325 to 475 and containing varying concentrations of solubilizing co-surfactant, and identifying the ratio of solubilizing co-surfactant which produces the maximum fluid viscosity.

* * * * *